United States Patent
Kim et al.

(10) Patent No.: US 8,797,357 B2
(45) Date of Patent: Aug. 5, 2014

(54) TERMINAL, SYSTEM AND METHOD FOR PROVIDING AUGMENTED BROADCASTING SERVICE USING AUGMENTED SCENE DESCRIPTION DATA

(71) Applicant: Electronics and Telecommunications Research Institute, Daejeon (KR)

(72) Inventors: Jung-Hak Kim, Daejeon (KR); Soon-Choul Kim, Daejeon (KR); Bum-Suk Choi, Daejeon (KR); Jeoung-Lak Ha, Daejeon (KR); Young-Ho Jeong, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/874,317

(22) Filed: Apr. 30, 2013

(65) Prior Publication Data

US 2014/0059604 A1 Feb. 27, 2014

(30) Foreign Application Priority Data

Aug. 22, 2012 (KR) .................. 10-2012-0091900

(51) Int. Cl.
*G09G 5/00* (2006.01)
*G06T 19/00* (2011.01)
*H04N 5/45* (2011.01)
*G09G 5/14* (2006.01)
*H04N 5/445* (2011.01)
*G06F 3/00* (2006.01)
*G06F 3/048* (2013.01)

(52) U.S. Cl.
CPC ............... *G06T 19/006* (2013.01); *H04N 5/45* (2013.01); *H04N 5/44543* (2013.01); *G09G 5/14* (2013.01)

USPC ............. 345/633; 345/634; 348/564; 725/40; 715/790

(58) Field of Classification Search
CPC ....... G06T 19/006; G06T 11/60; G06T 15/00; G06T 19/00; G09G 5/377; G09G 2340/12; G09G 2354/00; H04N 21/4316; H04N 21/44008; G05B 2219/32014; G05B 2219/39449; G06K 9/00671
USPC ..................... 345/633, 634; 348/564; 725/40; 715/790

See application file for complete search history.

(56) References Cited

U.S. PATENT DOCUMENTS

| | | | |
|---|---|---|---|
| 2006/0064716 A1 * | 3/2006 | Sull et al. | 725/37 |
| 2008/0074424 A1 * | 3/2008 | Carignano | 345/473 |
| 2009/0234947 A1 * | 9/2009 | Decasper et al. | 709/224 |

(Continued)

FOREIGN PATENT DOCUMENTS

| | | | | |
|---|---|---|---|---|
| KR | 10-2009-0044702 | * | 5/2009 | G06Q 30/00 |
| KR | 10-0941749 B1 | | 2/2010 | |
| KR | 10-1018781 B1 | | 3/2011 | |

*Primary Examiner* — Hoang-Vu A Nguyen-Ba

(57) ABSTRACT

Provided are a terminal, system and method for providing augmented broadcasting service. The method includes receiving augmented broadcasting service information including information indicating that it is possible to provide augmented broadcasting service, information on an augmented content providing server, and information on an augmented scene description data providing server for presenting augmented content on a television (TV) screen, acquiring augmented scene description data and augmented content selected by a user from the augmented content providing server and the augmented scene description data providing server, and outputting the augmented content to be overlaid on broadcast content according to the augmented scene description data.

20 Claims, 7 Drawing Sheets

(56) References Cited

U.S. PATENT DOCUMENTS

| | | | |
|---|---|---|---|
| 2009/0280784 A1* | 11/2009 | Mousseau et al. | 455/414.3 |
| 2012/0058801 A1* | 3/2012 | Nurmi | 455/566 |
| 2012/0113285 A1* | 5/2012 | Baker et al. | 348/222.1 |
| 2012/0131610 A1* | 5/2012 | Fernandez Gutierrez et al. | 725/34 |
| 2012/0164938 A1* | 6/2012 | Jeong et al. | 455/3.05 |
| 2012/0218297 A1* | 8/2012 | Ur | 345/633 |
| 2012/0327119 A1* | 12/2012 | Woo et al. | 345/633 |
| 2013/0063487 A1* | 3/2013 | Spiegel et al. | 345/633 |
| 2013/0076788 A1* | 3/2013 | Ben Zvi | 345/633 |
| 2013/0162644 A1* | 6/2013 | Velkavrh et al. | 345/423 |
| 2013/0194306 A1* | 8/2013 | Song et al. | 345/633 |
| 2013/0249948 A1* | 9/2013 | Reitan | 345/633 |
| 2013/0260360 A1* | 10/2013 | Baurmann et al. | 434/365 |
| 2013/0278634 A1* | 10/2013 | Xu et al. | 345/633 |
| 2014/0015826 A1* | 1/2014 | Licata | 345/419 |
| 2014/0063061 A1* | 3/2014 | Reitan | 345/633 |

* cited by examiner

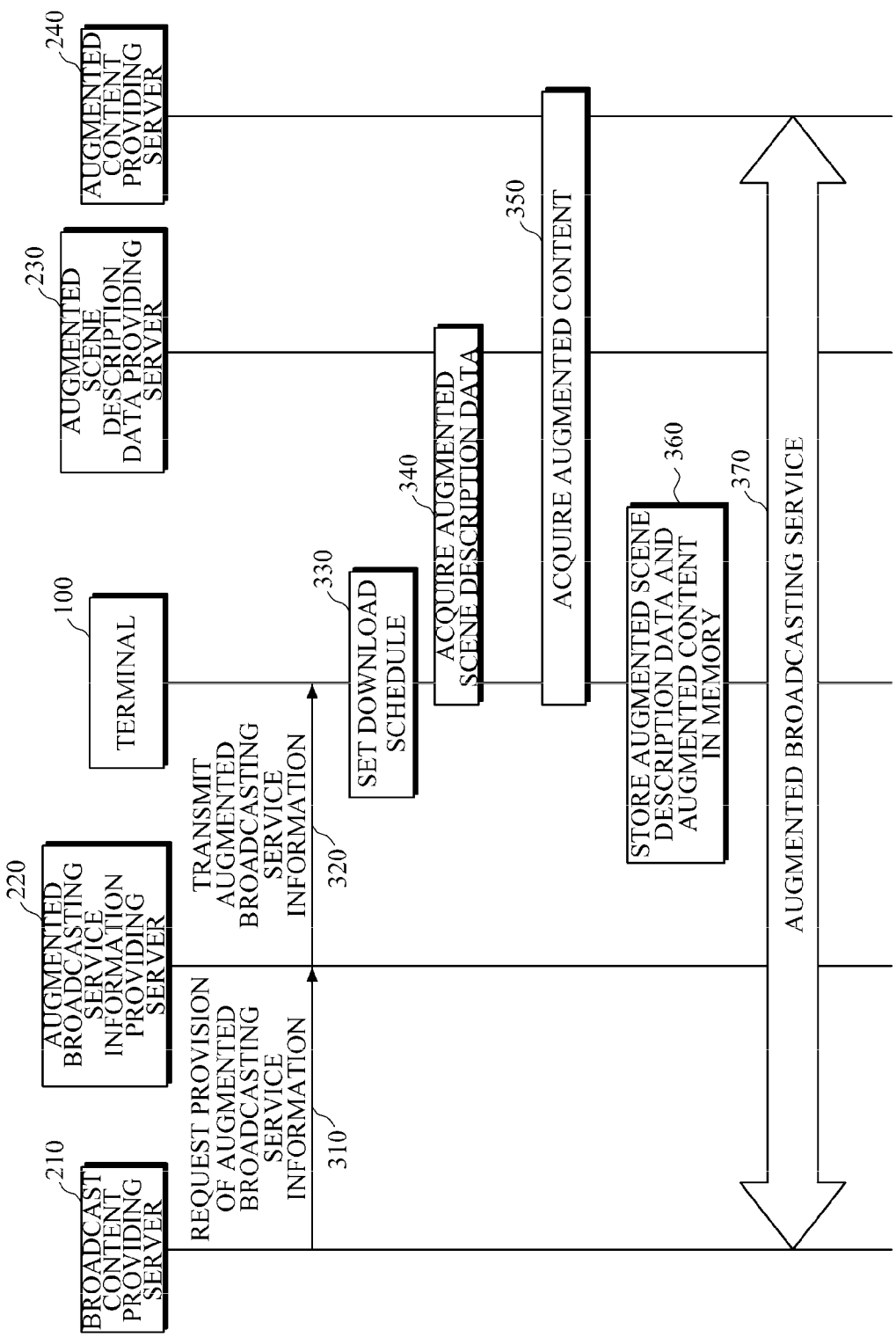

TERMINAL, SYSTEM AND METHOD FOR PROVIDING AUGMENTED BROADCASTING SERVICE USING AUGMENTED SCENE DESCRIPTION DATA

CROSS-REFERENCE TO RELATED APPLICATION

This application claims the benefit under 35 U.S.C. §119(a) of a Korean Patent Application No. 10-2012-0091900, filed on Aug. 22, 2012, the entire disclosure of which is incorporated herein by reference for all purposes.

BACKGROUND

1. Field

The following description relates to an apparatus and method for providing a broadcasting service, and more particularly, to a terminal, system and method for providing augmented broadcasting service in which a graphic object created using a computer is presented to be overlaid on a broadcast service image, and interaction is allowed between a user and the overlaid graphic object.

2. Description of the Related Art

Augmented reality (AR) denotes presentation of a graphic image created using a computer to be overlaid on a still image or a moving image played on a variety of platforms such as a mobile device, a tablet, a personal computer (PC) and a television (TV). In other words, AR may be technology for showing a virtual object overlaid on the real world. AR is becoming a new type of technological trend that provides various services such as advertising, entertainment and education.

With the proliferation of smart phones and the advent of various application programs, people want to experience various types of interaction through media used by their devices. According to such a tendency, AR services are advancing so that a user can obtain information in various forms through interaction with an overlaid graphic object in an application program executed on his or her device.

According to such a trend, AR service is provided in the field of TV broadcasting. Virtual advertising and a service in which a commentator tells users additional information using computer graphics in sport broadcasting, are examples of a typical service. However, strictly speaking, such services cannot be referred to as AR services in the true sense of the term. In these services, a TV broadcasting station merely transfers TV programs to which AR has been applied, to users as one-way media. In other words, no interaction that can be experienced in a mobile environment based on a smart phone has been taken into consideration.

Specifically, in the AR service provided in the field of existing TV broadcasting (services), a broadcast content video image and a graphic object image that is additionally shown to be overlaid on the video image, are synthesized to generate a new video image, and a continuous stream of such synthesized video images is transmitted as broadcast images to which AR has been applied.

Thus, a TV (or TV set-top box) cannot separately process an AR graphic object in a broadcast image to which AR service has been applied, and it is not possible to provide additional service through interaction between the AR graphic object and a user.

SUMMARY

The following description relates to a method of efficiently delivering information, data and augmentation content necessary for augmented broadcasting service, operation of a receiving terminal, and a method of processing received data.

In one general aspect, a method of providing augmented broadcasting service in a terminal includes: receiving augmented broadcasting service information including information indicating that it is possible to provide the augmented broadcasting service, information on an augmented content providing server, and information on an augmented scene description data providing server for presenting augmented content on a television (TV) screen; acquiring augmented scene description data and augmented content selected by a user from the augmented content providing server and the augmented scene description data providing server; and outputting the augmented content to be overlaid on broadcast content according to the augmented scene description data.

In another general aspect, a terminal for providing augmented broadcasting service includes: a broadcast receiver configured to receive augmented broadcasting service information including information indicating that it is possible to provide the augmented broadcasting service, information on an augmented content providing server, and information on an augmented scene description data providing server for presenting augmented content on a TV screen, and broadcast content via a broadcasting network; an augmented broadcasting service data acquisitor configured to acquire augmented scene description data and augmented content selected by a user from the augmented content providing server and the augmented scene description data providing server via a wired/wireless communication network according to augmented broadcasting service information received by the broadcast receiver; and an augmented broadcast synthesizer configured to output the augmented content to be overlaid on the broadcast content received by the broadcast receiver according to the augmented scene description data acquired by the augmented broadcasting service data acquisitor.

In still another general aspect, a method of providing augmented broadcasting service includes: when broadcast content provided by a broadcast content providing server is a program providing the augmented broadcasting service, transmitting, at an augmented broadcasting service information providing server, augmented broadcasting service information including information indicating that it is possible to provide the augmented broadcasting service, information on an augmented content providing server, and information on an augmented scene description data providing server for presenting augmented content on a TV screen to at least one terminal; when the terminal accesses the augmented content providing server, providing, at the augmented content providing server, augmented content selected by a user; and when the terminal accesses the augmented scene description data providing server, providing, at the augmented scene description data providing server, augmented scene description data selected by the user.

In yet another general aspect, a system for providing augmented broadcasting service includes: a broadcast content providing server; an augmented broadcasting service information providing server configured to transmit augmented broadcasting service information including information indicating that it is possible to provide the augmented broadcasting service, augmented content providing server information, and augmented scene description data providing server information for presenting augmented content on a TV screen to at least one terminal when broadcast content provided by the broadcast content providing server is a program providing the augmented broadcasting service; an augmented content providing server configured to provide augmented content selected by a user when the terminal accesses the augmented content providing server; and an augmented scene description data providing server configured to provide augmented scene description data selected by the user when the terminal accesses the augmented scene description data providing server.

Other features and aspects will be apparent from the following detailed description, the drawings, and the claims.

BRIEF DESCRIPTION OF THE DRAWINGS

FIG. 3 is a signal flowchart illustrating a method of providing augmented broadcasting service according to an embodiment of the present invention.

Figure 1:
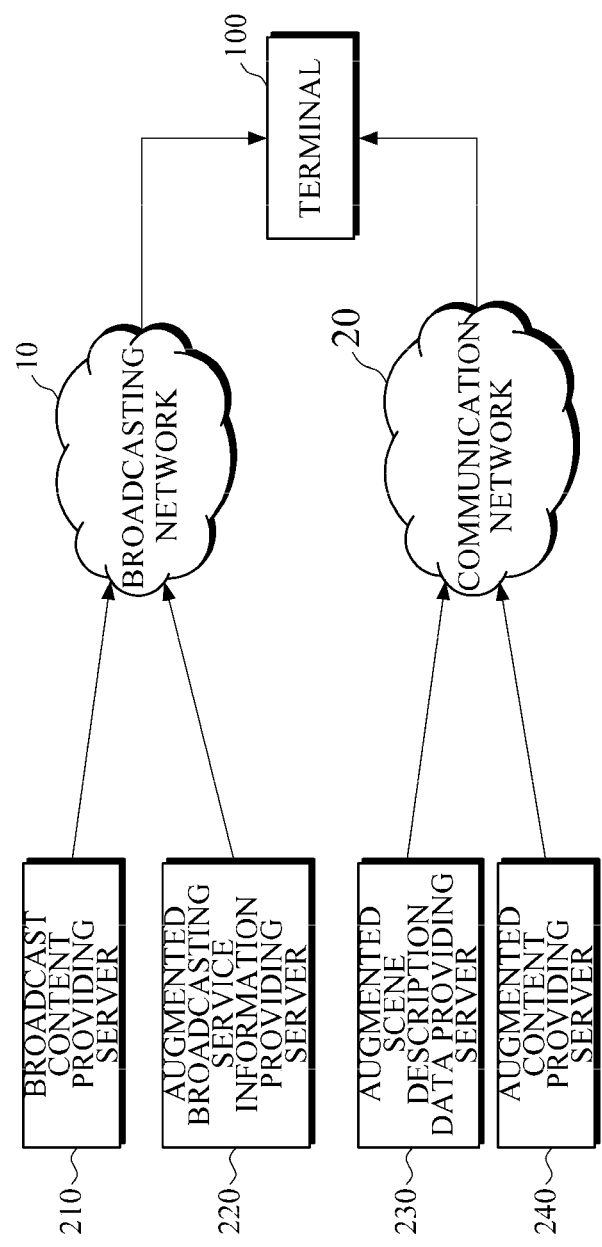
FIG. 1 is a diagram showing a constitution of a system for providing augmented broadcasting service according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram showing a constitution of a system for providing augmented broadcasting service according to an embodiment of the present invention.

Referring to FIG. 1, a terminal 100, such as a television (TV), enables a user to watch a broadcast, and includes a TV, a TV set-top box, and all user terminals providing TV service.

A broadcast content providing server 210 broadcasts broadcast content data to at least one terminal 100 via a broadcasting network 10. When the broadcast content is a program providing augmented broadcasting service, the broadcast content providing server 210 broadcasts information indicating that it is possible to provide the augmented broadcasting service to the at least one terminal 100.

Then, the terminal 100 accesses an augmented scene description data providing server 230 and an augmented content providing server 240 via a communication network 20 to acquire augmented content and augmented scene description data for augmented broadcasting service, and then synthesizes the augmented content with broadcast content to provide augmented broadcasting service. At this time, according to an embodiment of the present invention, the terminal 100 causes the user to select augmented content and augmented scene description data, and synthesizes only the selected augmented content with the broadcast content. A detailed constitution and operation of the terminal 100 will be described later with reference to FIG. 2.

The broadcast content providing server 210 provides programs that deliver information in real time such as the news and sports, and programs such as drama series, movies, entertainment shows and documentaries that have been subjected to an editing process after filming. The broadcast content providing server 210 may be managed by a broadcasting station that directly creates broadcast content and transmits the broadcast content via a terrestrial broadcasting network, a cable broadcasting network, or the Internet, or by a cable or Internet broadcasting service provider that collects pieces of created broadcast content and retransmits the collected pieces of broadcast content through several channels.

When broadcast content is a program providing augmented broadcasting service, the augmented broadcasting service information providing server 220 provides information indicating that it is possible to provide augmented broadcasting service. In addition, the augmented broadcasting service information providing server 220 provides information on a server that provides augmented scene description data for presenting augmented content on a TV screen, and information on a server that provides augmented content.

The augmented scene description data providing server information includes a list (or file names) of augmented scene description data that the terminal 100 needs to download, and information on a server, that is, an address of the server, that needs to be accessed to download the augmented scene description data. The augmented scene description data providing server information can have various embodiments.

As an embodiment, the augmented scene description data providing server information may only include an address of a server that needs to be accessed to download augmented scene description data. In this case, the user is enabled to select and download desired augmented scene description data. In other words, the terminal 100 accesses the augmented scene description data providing server according to the augmented scene description data providing server information, and displays a web page in which it is possible to select augmented scene description data, so that the user can select and download desired augmented scene description data.

As another embodiment, the augmented scene description data providing server information may include an address of a server that needs to be accessed to download augmented scene description data, and a file name of the augmented scene description data. In this case, without a selection of the user, the terminal 100 accesses the augmented scene description data providing server according to the augmented scene description data providing server information, and downloads the indicated augmented scene description data.

Augmented scene description data can also be automatically transmitted to the terminal 100 by the augmented scene description data providing server 230. In this case, it has been taken into consideration that, when the terminal 100 accesses the augmented scene description data providing server 230, the augmented scene description data providing server 230 may automatically transmit augmented scene description data to the terminal 100 in the form of streaming, or frequently update augmented scene description data downloaded by the terminal 100.

Augmented scene description data may be updated in connection with broadcast content. In other words, when broadcast content is real-time content, augmented scene description data may be generated according to a time-varying situation, and delivered to the terminal 100 for frequent updating.

The augmented content providing server information includes a list of augmented content (or file names) that the terminal 100 needs to download, and information on a server that the terminal 100 needs to access to download the augmented content. Here, it needs to be taken into consideration that there may be a variety of augmented content providers. In other words, servers providing augmented content may be present in various forms, and various types of augmented content may be present in the servers providing augmented content.

The augmented content providing server information can have various embodiments.

As an embodiment, the augmented content providing server information may only include an address of a server that needs to be accessed to download augmented content. In this case, the user is enabled to select and download desired augmented content. In other words, the terminal 100 accesses the augmented content providing server according to the augmented content providing server information, and displays a web page in which it is possible to select augmented content, so that the user can select and download desired augmented content.

As another embodiment, the augmented content providing server information may include an address of a server that needs to be accessed to download augmented content, and a file name of the augmented content. In this case, without a selection of the user, the terminal 100 accesses the augmented content providing server according to the augmented content providing server information, and downloads the indicated augmented content.

In relation to a broadcasting program providing augmented broadcasting service, information indicating that it is possible to provide augmented broadcasting service, information on a server providing augmented content, information on a server providing augmented scene description data, etc. is provided in the form of a table, like a program association table/program map table (PAT/PMT) or an electronic program guide (EPG) used in a broadcasting system.

An example of an augmented broadcasting service information table of a plurality of broadcasting programs that provide augmented broadcasting service may be compiled as <Table 1> below.

AR_C_List_n may be a file name itself, or may indicate a list of augmented content files. When AR_C_List_n is a file name, the terminal 100 downloads the file only. When AR_C_List_n is a file list, URLs of augmented content files are contained in the list, and the terminal 100 downloads the augmented content files according to the list.

<Table 1> above is merely an example of a compilable augmented broadcasting service information table, and an augmented broadcasting service information table is not limited to <Table 1>. In other words, it is possible to compile augmented broadcasting service information tables in various forms according to types of provided augmented content providing server information and types of provided augmented scene description data providing server information.

When an augmented broadcasting service information table as described above is provided to the terminal 100, the user can select augmented scene description data and augmented content in advance, and the terminal 100 can download only the augmented scene description data and the augmented content selected by the user. In other words, it is possible to provide user-selected augmented broadcasting service. Such an augmented broadcasting service information table is multiplexed with broadcast content and transmitted. Also, the augmented broadcasting service information table is periodically transmitted.

The augmented scene description data providing server 230 can transmit augmented scene description data to the terminal 100 according to various embodiments.

In an embodiment, the terminal 100 may access the augmented scene description data providing server 230 without indicating specific augmented scene description data to download. In this case, the user is enabled to select and download desired augmented scene description data. In other words, the augmented scene description data providing server 230 provides data of a web page so that the user can select desired augmented scene description data through the terminal 100, and provides the corresponding augmented scene description data according to the selection of the user. In addition, when information such as a broadcasting program ID for identifying a broadcast content program is delivered

TABLE 1

| Broadcast Content Program ID | Address of Augmented Scene Description Data Server | List of Augmented Scene Description Data | Address of Augmented Content Provision Server | List of Augmented Content |
|---|---|---|---|---|
| 1 | AR_SD_Addr_1 | AR_SD_List_1 | AR_C_Addr_1 | AR_C_List_1 |
| 2 | AR_SD_Addr_2 | AR_SD_List_2 | AR_C_Addr_2 | AR_C_List_2 |
| . | . | . | . | . |
| . | . | . | . | . |
| . | . | . | . | . |
| n | AR_SD_Addr_n | AR_SD_List_n | AR_C_Addr_n | AR_C_List_n |

Referring to <Table 1> above, broadcast content programs may be identified using identifiers (IDs).

Augmented scene description data is downloaded on the basis of a uniform resource locator (URL) made by combining AR_SD_Addr_n and AR_SD_List_n. AR_SD_List_n may be a file name itself, or may indicate a list of augmented scene description data files. When AR_SD_List_n is a file name, the terminal 100 downloads the file only. When AR_SD_List_n is a file list, URLs of augmented scene description data files are contained in the list, and the terminal 100 downloads the augmented scene description data files according to the list.

Augmented content is downloaded on the basis of a URL made by combining AR_C_Addr_n and AR_C_List_n.

from the terminal 100 to the augmented scene description data providing server 230, the terminal 100 may be provided with data of a web page that enables the user to select only augmented scene description data related to the broadcast content program.

In another embodiment, the terminal 100 may indicate augmented scene description data to download and access the augmented scene description data providing server 230. In this case, without the selection process of the embodiment described above, the augmented scene description data providing server 230 provides the indicated augmented scene description data to the terminal 100.

The augmented scene description data providing server 230 may automatically transmit augmented scene description data to the terminal 100 in the form of streaming, or transmit information or data for frequently updating augmented scene description data downloaded by the terminal 100 to the terminal 100. In other words, when the terminal 100 accesses the augmented scene description data providing server 230, the augmented scene description data providing server 230 can maintain the connected state and automatically deliver augmented scene description data to the terminal 100. When the augmented scene description data providing server 230 delivers augmented scene description data to the terminal 100 for automatic updates through automatic transmission as mentioned above, it is possible to create augmented scene description data from a time-varying situation of broadcast content in connection with real-time broadcast content, and deliver the augmented scene description data.

Augmented scene description data is information related to a scene configuration for providing augmented broadcasting service, geometric attributes and graphical attributes of an augmented content object shown in the corresponding scene, an animation of the augmented content object, and so on.

Augmented scene description data includes information on times at which an augmented scene presenting augmented content is generated and removed, information on a position and the size of the augmented scene in a screen of a terminal, information for selecting or indicating an augmented content object to be presented in the augmented scene according to broadcast content and passage time, information indicating geometric attributes such as a size, a position and rotation and graphical attributes such as colors, texture and lighting effects of the augmented content object, information on an animation related to directing of an action of the augmented content object, and so on.

In some cases, augmented content providing server information may be included in augmented scene description data. In other words, augmented content providing server information is not necessarily included in the augmented broadcasting service information table.

The augmented content providing server 240 can transmit augmented content to the terminal 100 according to various embodiments.

As an embodiment, the terminal 100 may access the augmented content providing server 240 without indicating specific augmented content to download. In this case, the user is enabled to select and download desired augmented content. In other words, the augmented content providing server 240 provides data of a web page so that the user can select desired augmented content through the terminal 100, and provides the corresponding augmented content according to the selection of the user. In addition, when information such as a broadcasting program ID for identifying a broadcast content program is delivered from the terminal 100 to the augmented content providing server 240, the terminal 100 may be provided with data of a web page that enables the user to select only augmented content related to the broadcast content program.

In another embodiment, the terminal 100 may indicate augmented content to download and access the augmented content providing server 240. In this case, without the selection process of the embodiment described above, the augmented content providing server 240 provides the indicated augmented content to the terminal 100.

Augmented content may be presented in various forms such as a two-dimensional (2D) image, a three-dimensional (3D) graphic object, an image, a web page, and a flash animation. Augmented content may be presented to be overlaid on a broadcast content image in the form of a graphic object through a graphic process of a terminal. Also, a TV screen may be divided into some areas, a broadcast content image may be reduced to an appropriate size for an area, and in parallel with the broadcast content image, augmented content may be presented in another area with a proper size. In some of the aforementioned processes, before the broadcast content image and the augmented content object are synthesized into one complete image and output on a screen of a terminal, it is possible to separately access the augmented content object through a graphic processor and a user interface processor of the terminal and change attributes of the augmented content object, or to cause a certain operation by applying a predetermined instruction signal. Thus, the augmented content object needs to be created to be able to operate according to manipulation of the user when the user moves the augmented content object, adjusts the size of the augmented content object, or applies a certain instruction signal to the augmented content object. Also, the augmented content object may be created to present additional information such as a message or an advertisement in response to an input of the user, or to present additional information related to broadcast content.

Sports broadcast may be exemplified for the additional information related to broadcast content. Augmented content related to sports broadcast content needs to be created to be able to present time-varying situations with messages or graphics. In other words, rapidly changing situations of a sports program relayed through broadcasting may be the additional information.

Information included in augmented content, additional information related to the augmented content, etc., is not necessarily presented according to augmented scene description data. In some cases, pieces of information in which augmented content needs to be presented additional information related to the augmented content may be updated by the augmented content providing server 240. When broadcast content is real-time relay broadcast content such as sports, the augmented content providing server 240 may interoperate with the broadcast content providing server 210 to reflect pieces of time-varying information in augmented content, and present the time-varying information. To provide such service, a function is necessary for the terminal 100 to maintain a state in which it is possible to communicate with the augmented content providing server 240.

Figure 2:
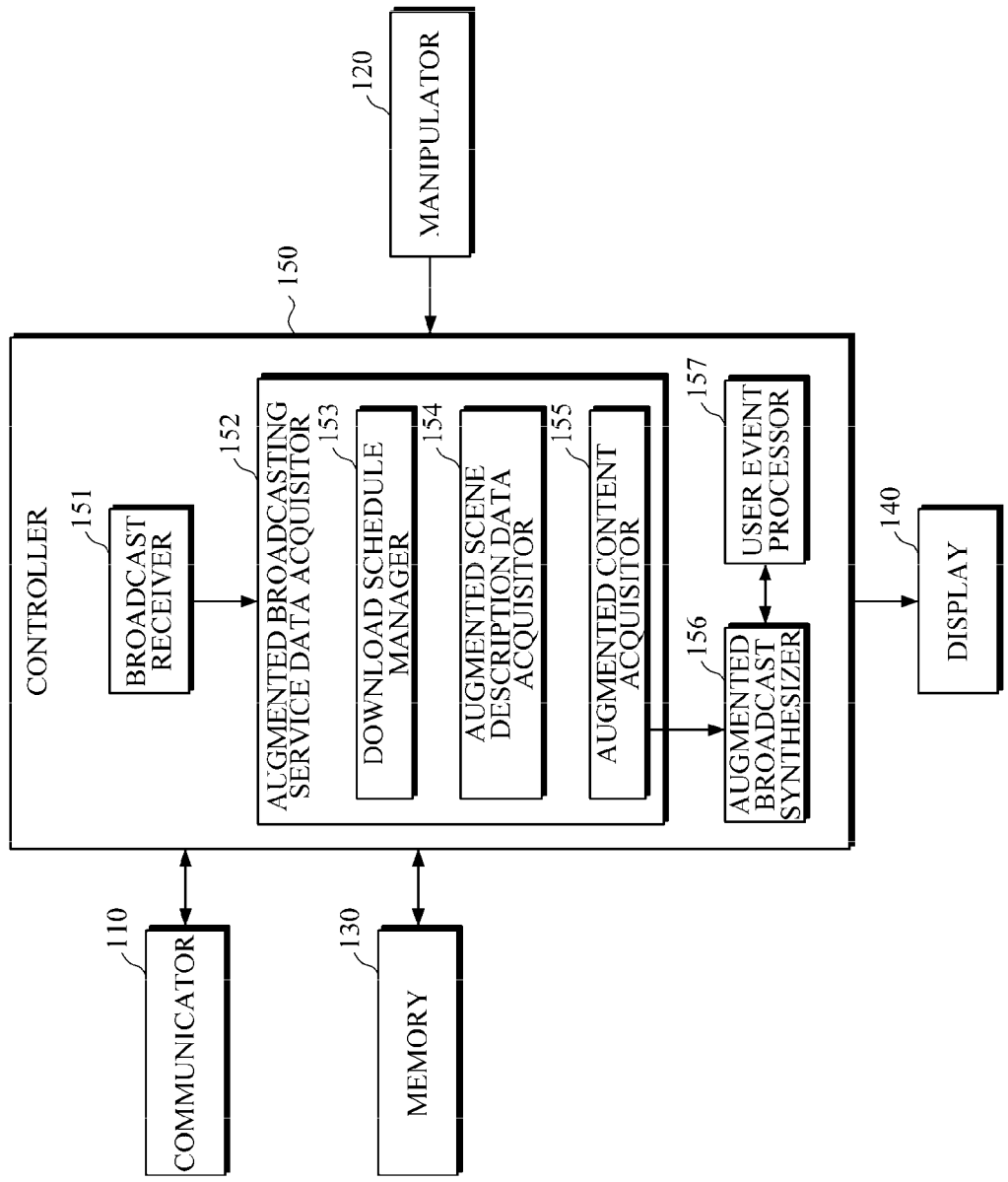
FIG. 2 is a schematic block diagram of a terminal receiving augmented broadcasting service according to an embodiment of the present invention.

FIG. 2 is a schematic block diagram of a terminal receiving augmented broadcasting service according to an embodiment of the present invention.

Referring to FIG. 2, a terminal 100 includes a communicator 110, a manipulator 120, a memory 130, a display 140, and a controller 150.

The communicator 110 receives broadcast content and an augmented broadcasting service information table via a broadcasting network 10 including various types of networks such as a terrestrial broadcasting network, a cable broadcasting network, and the Internet. Also, the communicator 110 accesses an augmented scene description data providing server 230 and an augmented content providing server 240 via various communication networks 20, such as wireless broadband Internet (WiBro™)networks, wireless fidelity (WiFi™)networks, Long Term Evolution (LTE™)networks, and Ethernet networks, capable of Internet service, and receives augmented scene description data and augmented content.

The manipulator 120 is an interface to which information can be input by a user, and is any possible means such as a keyboard, a mouse, a remote control or a touch screen. In FIG. 2, the manipulator 120 and the display 140 are separately shown, but may be integrated into a user interface, such as a touch screen. According to an embodiment of the present invention, augmented content selection information may be input from the user through the manipulator 120. Also, during the augmented broadcasting service, an event occurrence signal may be input from the user. Here, events denote various actions, such as shaking an augmented content object, moving the augmented content object, poking the augmented content object, and searching for a word or sentence, which the user can perform while watching TV.

The memory 130 may be implemented as a flash memory, etc., and stores the augmented broadcasting service information table, augmented scene description data and augmented content according to an embodiment of the present invention.

The display 140 outputs a still image signal or a moving image signal, and a screen is configured according to an embodiment of the present invention so that augmented content is overlaid on broadcast content.

The controller 150 controls components of the terminal 100 as described above, so that augmented broadcasting service in which augmented content and broadcast content are synthesized, is provided.

According to an embodiment of the present invention, the controller 150 includes a broadcast receiver 151, an augmented broadcasting service data acquisitor 152, an augmented broadcast synthesizer 156, and a user event processor 157.

The broadcast receiver 151 receives broadcast content data from a broadcast content providing server 210. Also, when the broadcast content is a program providing augmented broadcasting service, the broadcast receiver 151 receives information indicating that it is possible to provide augmented broadcasting service, and also the augmented broadcasting service information table including information on a server providing augmented content and information on a server providing augmented scene description data for presenting augmented content on a TV screen from an augmented broadcasting service providing server 220 via the broadcasting network 10.

The augmented broadcasting service data acquisitor 152 acquires augmented content and augmented scene description data necessary for augmented broadcasting, and includes a download schedule manager 153, an augmented scene description data acquisitor 154, and an augmented content acquisitor 155.

When the augmented broadcasting service information table is received, the download schedule manager 153 compiles a table that manages a schedule for downloading augmented scene description data and augmented content for respective pieces of broadcast content capable of providing augmented broadcasting service.

When augmented content is presented on a screen of the terminal 100, it takes time to perform a download process, and the necessary time may increase in proportion to the amount of data of an augmented content object. Thus, information indicating that it is possible to provide augmented broadcasting service, information on a server providing augmented content, information on a server providing augmented scene description data, etc. needs to be delivered to the terminal 100 before a broadcast content program providing augmented broadcasting service is started, and augmented scene description data and augmented content objects necessary for augmented broadcasting service needs to be downloaded by the terminal 100 before the broadcast content program providing augmented broadcasting service is started, or the corresponding augmented scene is presented on the screen of the terminal 100. Also, in consideration of times, etc. necessary for a process of the augmented broadcast synthesizer 156 loading an augmented content object and a process of the augmented broadcast synthesizer 156 processing the augmented content object according to graphic attribute data and animation data, the augmented content object needs to be loaded in advance.

In consideration of the conditions described above, a sequence in which augmented content objects are loaded onto the augmented broadcast synthesizer 156, and information on timings for the same may be provided to the terminal in the form of a predetermined table. This table may be included in the augmented broadcasting service information table, or augmented scene description data.

According to the table information, the download schedule manager 153 performs scheduling in consideration of times for downloading augmented scene description data and augmented content, time for loading an augmented content object onto the augmented broadcast synthesizer 156, time for processing the augmented content object according to graphic attribute data and animation, and so on. Also, the download schedule manager 153 may sequentially load augmented reality (AR) objects onto the augmented broadcast synthesizer 156 in advance.

The augmented scene description data acquisitor 154 accesses the augmented scene description data providing server 230 via a communication network 20 using an address included in the augmented broadcasting service information table at a time scheduled by the schedule manager 153, and downloads augmented scene description data of the respective pieces of broadcast content capable of providing augmented broadcasting service. According to an embodiment of the present invention, the augmented scene description data acquisitor 154 only downloads augmented scene description data selected through the manipulator 120 by the user. Augmented scene description data can be acquired according to various embodiments, which will be described in detail later with reference to FIG. 4a and FIG. 4b.

The augmented scene description data acquisitor 154 may maintain a connection with the augmented scene description data providing server 230, and frequently download augmented scene description data provided by the augmented scene description data providing server 230, or frequently perform an update of the augmented scene description data.

The augmented content acquisitor 155 accesses the augmented content providing server 240 via the communication network 20 at a time scheduled by the schedule manager 153, and downloads augmented content of the respective pieces of broadcast content capable of providing augmented broadcasting service. Augmented content can be acquired according to various embodiments, which will be described in detail later with reference to FIG. 4a and FIG. 4b.

When information on a start time of a broadcasting program and information on a passage time of the broadcasting program are periodically delivered to the terminal 100 together with the augmented broadcasting service information table, it is possible to efficiently download augmented content. At this time, the augmented content acquisitor 155 may download only augmented content permitted by interaction with the user through the manipulator 120, or may automatically download augmented content first and then present the augmented content by permission of the user when broadcast content is played. Also, the augmented content acquisitor 155 may maintain a connection with the augmented content providing server 240, and frequently download augmented content provided by the augmented content providing server 240, or frequently perform an update of the augmented content.

The augmented broadcast synthesizer 156 presents augmented content to be overlaid on a broadcast content image received by the broadcast receiver 151 in the form of a graphic object according to augmented scene description data downloaded by the augmented broadcasting service data acquisitor 152. Alternatively, the augmented broadcast synthesizer 156 presents augmented content in the form of a graphic object in parallel with a broadcast content image according to augmented scene description data. In other words, according to augmented scene description data, the augmented broadcast synthesizer 156 may divide the TV screen, and output broadcast content in a divided part and augmented content in another divided part.

When passage time of broadcast content or frame sequence information on broadcast content images whereby it is possible to know the passage time of broadcast content, is continuously delivered to the terminal 100 together with the broadcast content, augmented content may be presented in synchronization with the broadcast content.

Passage time information on broadcast content needs to be periodically transmitted for the following reason: Augmented broadcasting service according to an embodiment of the present invention is basically intended to display augmented content synchronized with a scene of broadcast content on the basis of a scenario of the broadcast content or scenes constituting the scenario and various elements constituting the scenes at an accurate point in time, and thus is in need of accurate time information. However, time information that is generally used for streaming broadcast content via a broadcasting network does not represent an accurate start point in time of the broadcast content or passage time of the broadcast content, and thus it is almost impossible to synchronize the broadcast content with augmented content using the time information used for streaming the broadcast content. Also, when broadcast content is streamed, only information on a start point in time of the broadcast content is insufficient because a user does not necessarily watch certain broadcast content from the beginning. Thus, unless time information representing the degree of progress of broadcast content is periodically transmitted, it is not possible to accurately synchronize augmented content with the broadcast content.

When the user causes a predetermined event on an augmented content object presented in the TV screen, the user event processor 157 plays an animation related to the augmented content, or outputs additional information in response to the event. In some cases, the user event processor 157 may interoperate with the augmented broadcasting service data acquisitor 152 to download augmented scene description data related to the augmented content, download new augmented content, or download various other types of information. In this case, information indicating whether or not an augmented content object is capable of interacting with a user needs to be included in a protocol related to user interaction, that is, augmented scene description data. Presentation of the augmented content object is made on the basis of content of the augmented scene description data, and when an input event is caused by the user, the input event is reflected as an interrupt process. In other words, after an interrupt service routine is processed, the object is presented according to the content of the augmented scene description data.

While using augmented broadcasting service, the user may cause the predetermined event on an augmented content object, or request additional information related to the augmented broadcasting service and broadcast content. To process such an event or request, a process method needs to be stated somewhere.

The user's action of causing a predetermined event on an augmented content object, or requesting additional information related to the augmented broadcasting service and broadcast content, and an action of providing service corresponding to the user's action, may be referred to as interaction. A predictable action of the user related to such interaction and service type corresponding to the action of the user may be stated in the augmented scene description data, animation data of augmented content interoperating with the augmented content, or descriptive data of a similar type to the animation data. Here, the action of the user denotes various actions, such as shaking an augmented content object, moving the augmented content object, poking the augmented content object, and searching for a word or sentence, that the user can perform using a keyboard, a mouse, a remote control or a variety of other devices while watching TV, and the service type corresponding to the action of the user denotes various types of service, such as playing an animation of the augmented content object, outputting a certain message, outputting a certain web page, and downloading another augmented content object.

FIG. 3 is a signal flowchart illustrating a method of providing augmented broadcasting service according to an embodiment of the present invention. Here, description will be made regarding broadcast content of only augmented broadcasting service for providing AR service.

Referring to FIG. 3, in operation 310, a broadcast content providing server 210 transmits a message for requesting provision of augmented broadcasting service information to an augmented broadcasting service information providing server 220 when broadcast content is a program providing augmented broadcasting service.

According to a schedule determined on the basis of the same time information, the broadcast content providing server 210 and the augmented broadcasting service information providing server 220 may broadcast broadcast content and augmented broadcasting service information via a broadcasting network, respectively. In other words, the broadcast content providing server 210 and the augmented broadcasting service information providing server 220 may each transmit data needing to be sent according to the determined schedule without additional request signals.

There is a multiplexer in the broadcasting network. The multiplexer multiplexes broadcast content and augmented broadcasting service information. The multiplexer performs the corresponding function according to Motion Picture Experts Group (MPEG)-2 transport stream (TS), that is a broadcasting transmission standard.

In operation 320, the augmented broadcasting service information providing server 220 broadcasts augmented broadcasting service information including information indicating that it is possible to provide augmented broadcasting service, augmented content providing server information, and augmented scene description data providing server information for presenting augmented content on a TV screen to a terminal 100.

In relation to a broadcasting program providing augmented broadcasting service, the information indicating that it is possible to provide augmented broadcasting service, the information on a server providing augmented content, the information on a server providing augmented scene description data, etc. may be provided in the form of a table (referred to as augmented broadcasting service information table below), like a PAT/PMT or an EPG used in a broadcasting system. An example of the augmented broadcasting service information table is shown in <Table 1> above. When such an augmented broadcasting service information table is provided to the terminal 100, the user can select augmented scene description data and augmented content in advance, and the terminal 100 can download only the augmented scene description data and the augmented content selected by the user. In other words, it is possible to provide user-selected augmented broadcasting service. Such an augmented broadcasting service information table may be multiplexed with broadcast content and transmitted. Also, the augmented broadcasting service information table may be periodically transmitted.

In operation 330, the terminal sets a download schedule.

In operation 340, the terminal accesses an augmented scene description data providing server 230, and acquires the augmented scene description data selected by the user. The augmented scene description data providing server information includes a list (or file names) of augmented scene description data that the terminal 100 needs to download, and information on a server, that is, an address of the server, that the terminal 100 needs to access to download the augmented scene description data. This will be described in detail later with reference to FIG. 4a and FIG. 4b.

In operation 350, the terminal accesses an augmented content providing server 240 and acquires the augmented content selected by the user. This will be described in detail later with reference to FIG. 5a and FIG. 5b.

In operation 360, the terminal 100 stores the received augmented content and augmented scene description data in a memory.

When the augmented scene description data and the augmented content are acquired in advance, augmented broadcasting service is provided in operation 370.

At this time, the broadcast content providing server 210 broadcasts broadcast content to the terminal 100, and the terminal 100 outputs the augmented content to be overlaid on the broadcast content.

The augmented content may be presented in various forms such as a 2D image, a 3D graphic object, an image, a web page, and a flash animation. The augmented content may be presented to be overlaid on a broadcast content image in the form of a graphic object through a graphic process of the terminal 100. Also, a TV screen may be divided into some areas, a broadcast content image may be reduced to an appropriate size for an area, and in parallel with the broadcast content image, augmented content may be presented in another area with a proper size. In some of the aforementioned processes, before the broadcast content image and the augmented content object are synthesized into one complete image and output on a screen of the terminal 100, it is possible to separately access the augmented content object through a graphic processor and a user interface processor of the terminal 100 and change attributes of the augmented content object, or to cause a certain operation by applying a predetermined instruction signal. Thus, the augmented content object needs to be created to be able to operate according to manipulation of the user when the user moves the augmented content object, adjusts the size of the augmented content object, or applies a certain instruction signal to the augmented content object. Also, the augmented content object may be created to present additional information such as a message or an advertisement in response to the input of the user, or to present additional information related to broadcast content.

Although not shown in the drawing, as described above, an event of a user input may occur while augmented broadcasting service is provided. The terminal 100 processes the user event.

Augmented scene description data may be updated in connection with broadcast content. In other words, when broadcast content is real-time content, augmented scene description data may be generated according to a time-varying situation, and delivered to the terminal 100 for frequent updating.

Figure 4A:
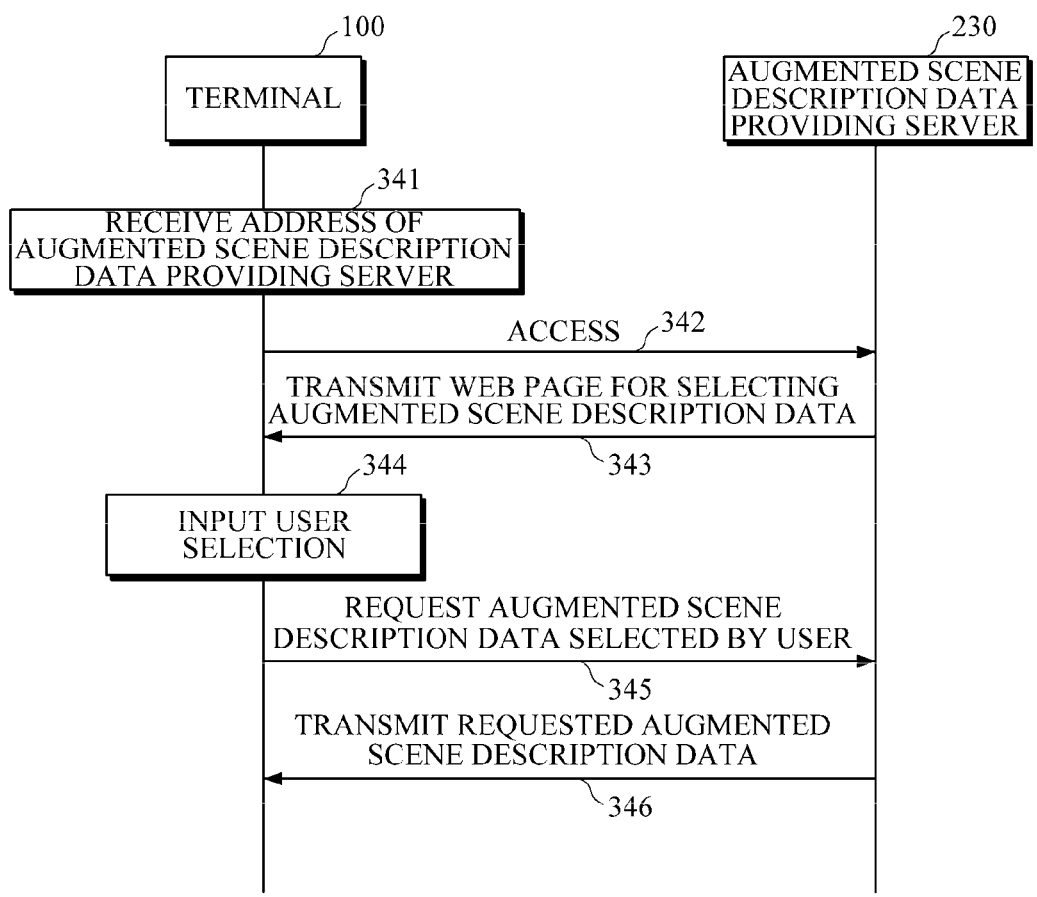
FIG. 4a is a signal flowchart illustrating a process of acquiring augmented scene description data according to an embodiment of the present invention.

FIG. 4a is a signal flowchart illustrating a process of acquiring augmented scene description data according to an embodiment of the present invention.

Referring to FIG. 4a, in operation 341, a terminal 100 receives only an address of a server that needs to be accessed to download augmented scene description data as augmented scene description data providing server information.

In operation 342, the terminal 100 accesses an augmented scene description data providing server 230 having the received address.

In operation 343, the augmented scene description data providing server 230 transmits a web page in which it is possible to select augmented scene description data to the terminal 100. At this time, when information, such as a broadcasting program ID for identifying a broadcast content program, is delivered from the terminal 100 to the augmented scene description data providing server 230, the terminal 100 may be provided with data of a web page that enables a user to select only augmented scene description data related to the broadcast content program.

In operation 344, the terminal 100 displays the web page, and receives an input of selection information on augmented scene description data desired by the user.

In operation 345, the terminal 100 requests the augmented scene description data selected by the user from the augmented scene description data providing server 230.

In operation 346, the augmented scene description data providing server 230 transmits the requested augmented scene description data to the terminal 100.

Figure 4B:
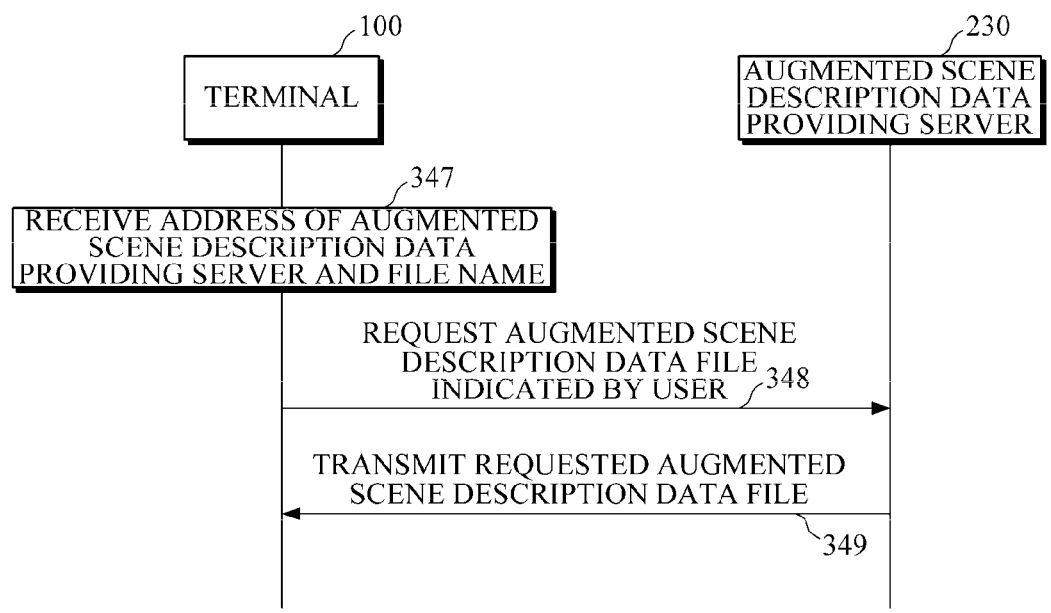
FIG. 4b is a signal flowchart illustrating a process of acquiring augmented scene description data according to another embodiment of the present invention.

FIG. 4b is a signal flowchart illustrating a process of acquiring augmented scene description data according to another embodiment of the present invention.

Referring to FIG. 4b, in operation 347, a terminal 100 receives an address of a server that needs to be accessed to download augmented scene description data and a file name of the augmented scene description data as augmented scene description data providing server information.

In operation 348, the terminal 100 requests an augmented scene description data file indicated by the augmented scene description data providing server information from an augmented scene description data providing server 230.

Then, in operation 349, the augmented scene description data providing server 230 transmits the requested augmented scene description data file to the terminal 100.

Figure 5A:
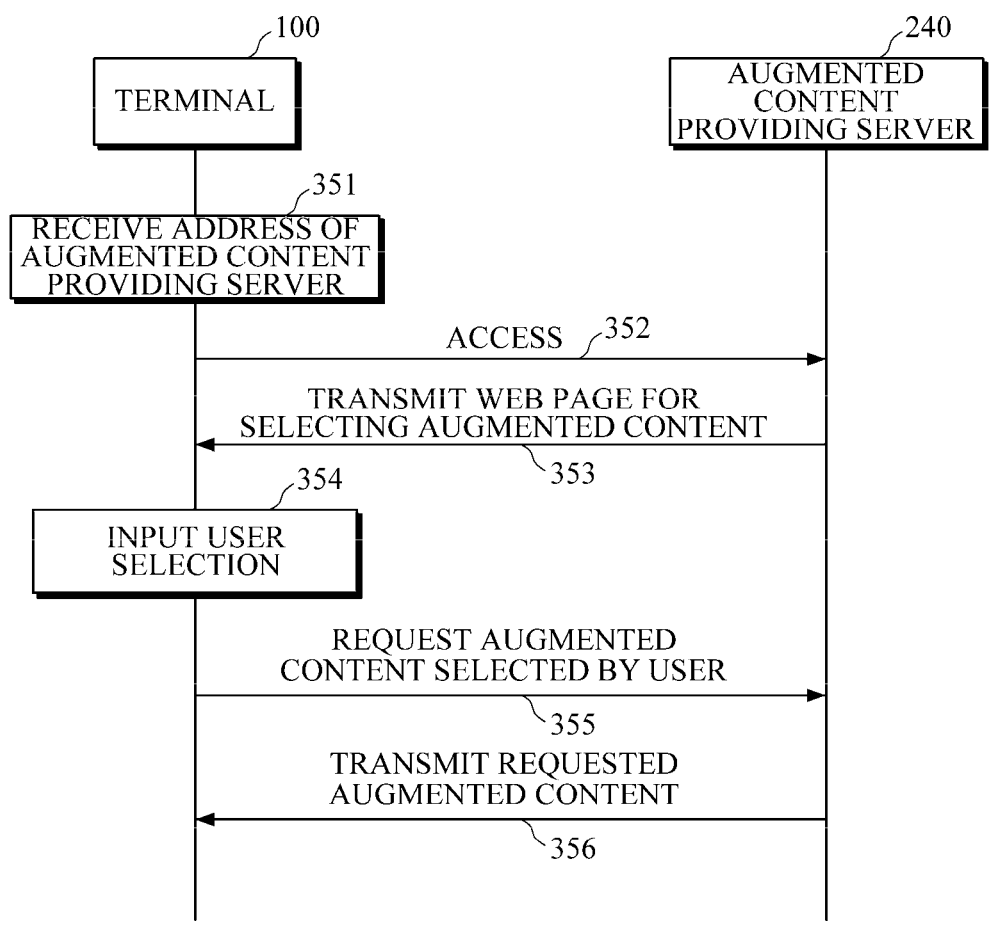
FIG. 5a is a signal flowchart illustrating a process of acquiring augmented content according to an embodiment of the present invention.

FIG. 5a is a signal flowchart illustrating a process of acquiring augmented content according to an embodiment of the present invention.

Referring to FIG. 5a, in operation 351, a terminal receives only an address of a server that needs to be accessed to download augmented content as augmented content providing server information.

In operation 352, the terminal 100 accesses an augmented content providing server 240 having the received address.

In operation 353, the augmented content providing server 240 transmits a web page in which it is possible to select augmented content to the terminal 100. At this time, when information, such as a broadcasting program ID for identifying a broadcast content program, is delivered from the terminal 100 to the augmented content providing server 240, the terminal 100 may be provided with data of a web page that enables a user to select augmented content related to the broadcast content program.

In operation 354, the terminal 100 displays the web page, and receives an input of selection information on augmented content desired by the user.

In operation 355, the terminal 100 requests the augmented content selected by the user from the augmented content providing server 240.

In operation 356, the augmented content providing server 240 transmits the requested augmented content to the terminal 100.

Figure 5B:
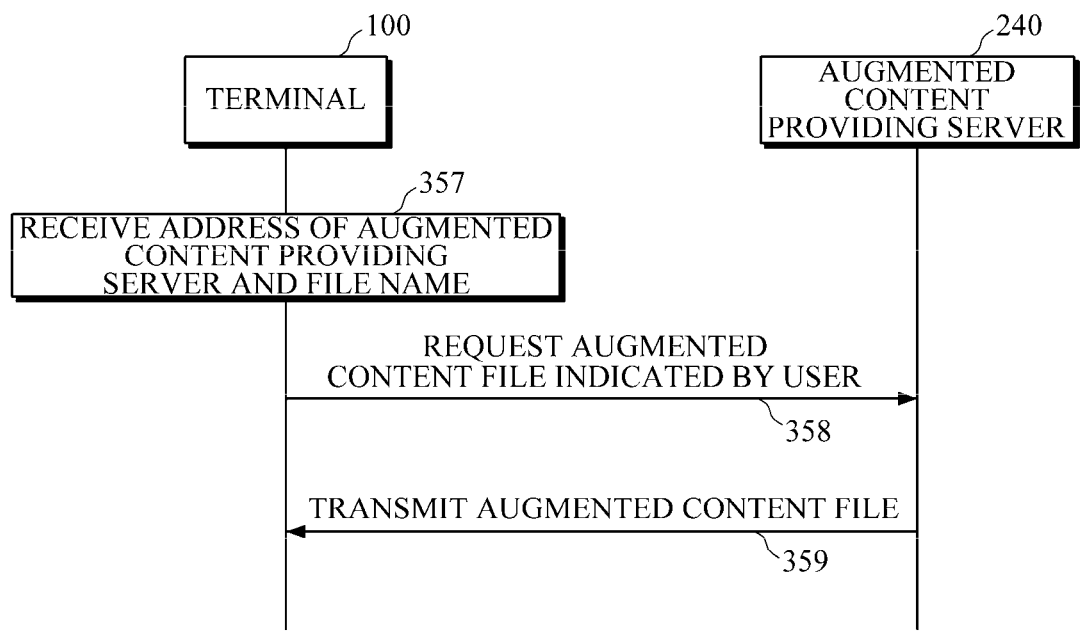
FIG. 5b is a signal flowchart illustrating a process of acquiring augmented content according to another embodiment of the present invention.

FIG. 5b is a signal flowchart illustrating a process of acquiring augmented content according to another embodiment of the present invention.

Referring to FIG. 5b, in operation 357, a terminal 100 receives an address of a server that needs to be accessed to download augmented content and a file name of the augmented content as augmented content providing server information.

In operation 358, the terminal 100 requests an augmented content file indicated by the augmented content providing server information from an augmented content providing server 240.

Then, in operation 359, the augmented content providing server 240 transmits the requested augmented content file to the terminal 100.

The present invention can be implemented as computer readable codes in a computer readable record medium. Computer readable record media include all types of record media in which computer readable data is stored. Examples of computer readable record media include a ROM, a RAM, a CD-ROM, a magnetic tape, a floppy disk, and optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing augmented broadcasting service in a terminal, comprising:
   receiving augmented broadcasting service information including information indicating that it is possible to provide augmented broadcasting service, information on an augmented content providing server, and information on an augmented scene description data providing server for presenting augmented content;
   acquiring augmented scene description data and augmented content selected by a user from the augmented content providing server and the augmented scene description data providing server; and
   outputting the augmented content to be overlaid on broadcast content according to the augmented scene description data, wherein
   the broadcast content includes passage time information,
   the augmented content includes an augmented scene object, and
   the augmented scene description data includes information for presenting the augmented scene object according to the passage time information.

2. The method of claim 1, wherein the acquiring of the augmented scene description data and the augmented content includes setting a download schedule for acquiring the augmented scene description data and the augmented content.

3. The method of claim 1, further comprising, when an event of a user input occurs while augmented broadcasting service is being provided, processing the user event.

4. A terminal for providing augmented broadcasting service, comprising:
   a broadcast receiver configured to receive, via a broadcast network, broadcast content and augmented broadcasting service information including information indicating that it is possible to provide augmented broadcasting service, information on an augmented content providing server, and information on an augmented scene description data providing server for presenting augmented content;
   an augmented broadcasting service data acquisitor configured to acquire augmented scene description data and augmented content selected by a user from the augmented content providing server and the augmented scene description data providing server via a wired/wireless communication network according to the augmented broadcasting service information received by the broadcast receiver; and
   an augmented broadcast synthesizer configured to output the augmented content to be overlaid on the broadcast content received by the broadcast receiver according to the augmented scene description data acquired by the augmented broadcasting service data acquisitor, wherein
   the broadcast content includes passage time information,
   the augmented content includes an augmented scene object, and
   the augmented scene description data includes information for presenting the augmented scene object according to the passage time information.

5. The terminal of claim 4, wherein the augmented broadcasting service data acquisitor includes:
   a download schedule manager configured to set a download schedule;
   an augmented scene description data acquisitor configured to acquire the augmented scene description data at a time scheduled by the download schedule manager; and
   an augmented content acquisitor configured to acquire the augmented content at a time scheduled by the download schedule manager.

6. The terminal of claim 4, wherein, when the broadcast content is real-time content, the augmented broadcasting service data acquisitor frequently updates the augmented scene description data and the augmented content.

7. A method of providing augmented broadcasting service, comprising:
   when broadcast content provided by a broadcast content providing server is a program providing augmented broadcasting service, transmitting, at an augmented broadcasting service information providing server, augmented broadcasting service information including information indicating that it is possible to provide augmented broadcasting service, information on an augmented content providing server, and information on an augmented scene description data providing server for presenting augmented content;
   when a terminal accesses the augmented content providing server, providing, at the augmented content providing server, the augmented content; and when the terminal accesses the augmented scene description data providing server, providing, at the augmented scene description data providing server, augmented scene description data, wherein the broadcast content includes passage time information, the augmented content includes an augmented scene object, and the augmented scene description data includes information for presenting the augmented scene object according to the passage time information.

8. The method of claim 7, wherein the augmented broadcasting service information is provided in the form of a table including a program association table/program map table (PAT/PMT) or an electronic program guide (EPG).

9. The method of claim 7, wherein the augmented broadcasting service information is periodically transmitted.

10. The method of claim 7, wherein the providing of the augmented scene description data includes:

when a terminal receiving only an address of the augmented scene description data providing server accesses the augmented scene description data providing server, displaying a web page in which it is possible to select augmented scene description data on a screen of the terminal;

receiving an input of selection information on the augmented scene description data desired by a user; and providing the augmented scene description data selected by the user.

11. The method of claim 7, wherein the providing of the augmented scene description data includes:

receiving a request for an augmented scene description data file indicated by a terminal receiving an address of the server that needs to be accessed to download the augmented scene description data and a file name of the augmented scene description data as the augmented scene description data providing server information; and transmitting the indicated augmented scene description data file to the terminal.

12. The method of claim 7, wherein the providing of the augmented content includes:

when a terminal receiving an address of the augmented content providing server information accesses the augmented content providing server, displaying a web page in which it is possible to select augmented content on a screen;

receiving an input of selection information on the augmented content desired by a user; and providing the augmented content selected by the user to the terminal.

13. The method of claim 7, wherein the providing of the augmented content includes:

receiving a request for an augmented content file indicated by a terminal receiving an address of the server that needs to be accessed to download the augmented content and a file name of the augmented content as the augmented content providing server information; and transmitting, at the augmented content providing server, the augmented content file indicated by the terminal to the terminal.

14. A system for providing augmented broadcasting service, comprising:

a broadcast content providing server;

an augmented broadcasting service information providing server configured to transmit augmented broadcasting service information including information indicating that it is possible to provide augmented broadcasting service, augmented content providing server information, and augmented scene description data providing server information for presenting augmented content, when broadcast content provided by the broadcast content providing server is a program providing augmented broadcasting service;

an augmented content providing server configured to provide the augmented content when a terminal accesses the augmented content providing server; and an augmented scene description data providing server configured to provide augmented scene description data when the terminal accesses the augmented scene description data providing server, wherein the broadcast content includes passage time information, the augmented content includes an augmented scene object, and the augmented scene description data includes information for presenting the augmented scene object according to the passage time information.

15. The system of claim 14, wherein, when the terminal accesses the augmented scene description data providing server, the augmented scene description data providing server displays a web page in which it is possible to select augmented scene description data on a screen of the terminal, and provides the augmented scene description data selected by a user.

16. The system of claim 15, wherein, when information for identifying a broadcast content program is received from the terminal, the augmented scene description data providing server displays a web page in which it is possible to select only augmented scene description data related to the broadcast content program.

17. The system of claim 14, wherein the augmented scene description data providing server transmits an augmented scene description data file requested by the terminal accessing the augmented scene description data providing server.

18. The system of claim 14, wherein, when the terminal accesses the augmented content providing server, the augmented content providing server displays a web page in which it is possible to select augmented content on a screen of the terminal, and provides the augmented content selected by a user to the terminal.

19. The system of claim 18, wherein, when information for identifying a broadcast content program is received from the terminal, the augmented content providing server displays a web page in which it is possible to select only augmented content related to the broadcast content program on the terminal.

20. The system of claim 19, wherein, when an indicated augmented content file is requested from the accessing terminal, the augmented content providing server transmits the augmented content file indicated by the terminal to the terminal.

* * * * *